UNITED STATES PATENT OFFICE.

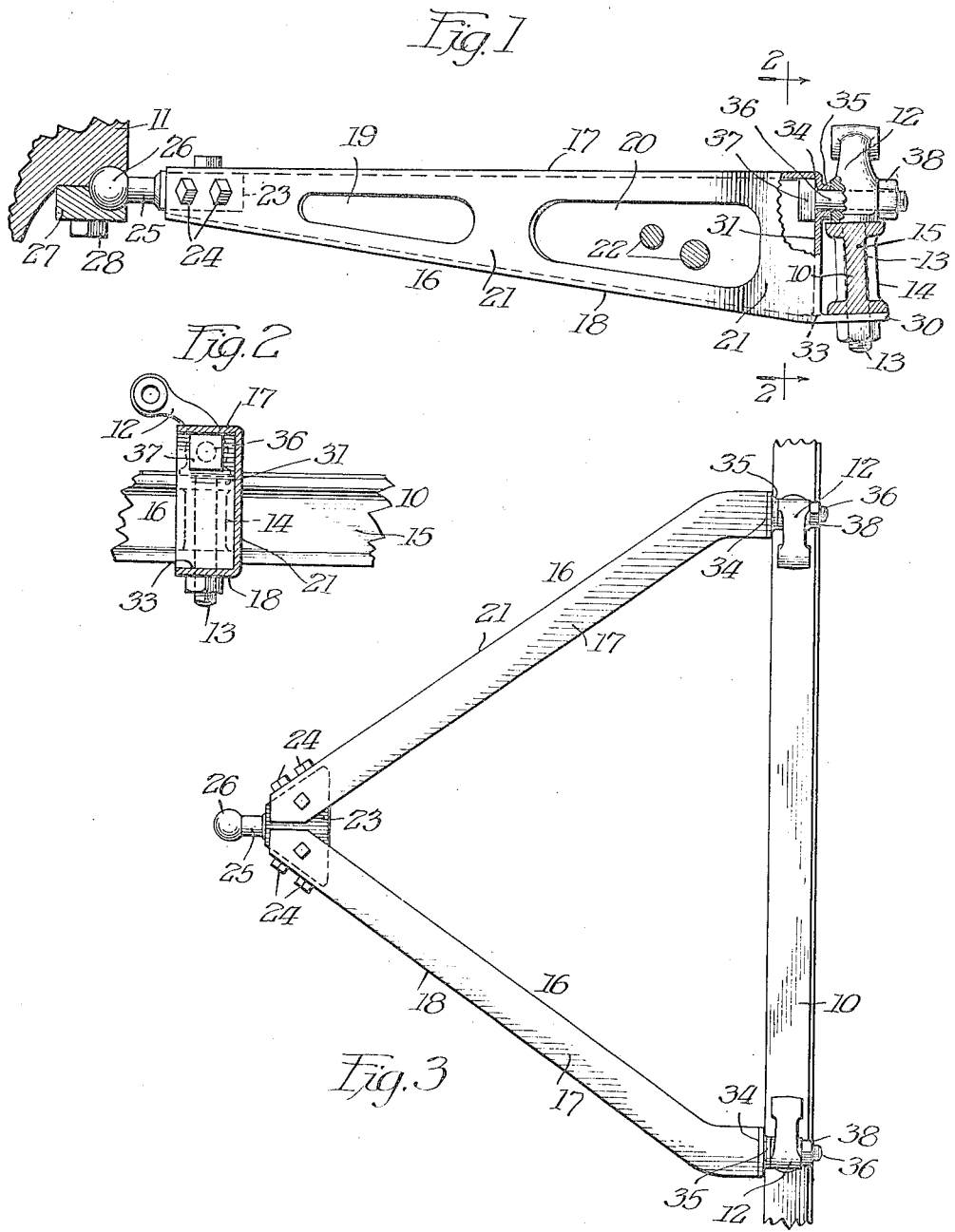

WALTER G. HOY, OF CHICAGO, ILLINOIS.

RADIUS-ROD.

1,302,166. Specification of Letters Patent. Patented Apr. 29, 1919.

Application filed January 11, 1919. Serial No. 270,621.

*To all whom it may concern:*

Be it known that I, WALTER G. HOY, a citizen of the United States, residing at Chicago, in the county of Cook and State of Illinois, have invented certain new and useful Improvements in Radius-Rods, of which the following is a specification.

My invention relates to improvements in radius rods for self-propelled vehicles, and is of particular service in connection with such vehicles which are equipped with transversely-extending front leaf spring arrangements.

The principal objects of the invention are to provide an improved construction whereby the front axle is maintained at the proper angle relative to the vertical, so that the machine will steer correctly and without undue effort; to provide an arrangement of the class described, which is so constructed that no adjustment, fitting, or other special work is required when installing the device as a substitute part for such vehicles; to provide an arrangement such that the installing of the device automatically involves forcing the axle into its correct position and subsequently holds it positively in such position; to provide an arrangement which shall be simple in design and economical to manufacture, while being practical and efficient in operation, and in general, to provide an improved construction of the character referred to.

In the drawings which illustrate one form of my invention as applied to Fords,

Figure 1 is a side elevation of the radius truss construction, certain parts being shown in section, Fig. 2 is a section taken on the line 2 2 of Fig. 1, and Fig. 3 is a plan view of the device shown in Fig. 1.

Referring to the drawings, 10 represents the usual front axle of a Model T Ford, the frame of the machine being indicated at 11. The usual bracket 12 to which the front spring shackle is connected, is retained, said bracket 12 constituting in effect the head of a bolt, the shank 13 of which passes through an enlargement or swell 14 of the vertical web 15 of the axle.

Each of the radius rods 16 to which my invention particularly relates, is of so-called truss construction; that is to say, I employ a cross-section in which the upper part 17 and lower part 18 of the truss are spaced vertically a sufficient distance to provide great strength and rigidity for resisting bending stresses. In the present instance, the truss, as a whole, is of thin sheet metal formed up into channel shape, as indicated clearly in Fig. 2 of the drawings, suitable apertures 19 and 20 being cut in the web 21 of the channel to reduce the weight and also to provide room for the usual steering rods 22 to operate.

The two radius rods or trusses 16 are united at their rear ends to a junction piece 23 by means of suitable cap screws 24, said junction piece having a tail or extension 25 formed with a ball 26 similar to the ball with which the vehicle is equipped when it leaves the Ford factory. Said ball 26 forms the male portion of a ball and socket joint, the female of which is formed by a part on the frame 11, and a cap piece 27 secured thereto by the bolts or screws 28.

As shown clearly in Fig. 1 of the drawings, the bottom flange 29 of the truss rod is extended forwardly under the axle to provide a projecting lug 30 which is perforated to fit over and receive the threaded shank previously referred to.

The end of the web 21 is bent over at right angles, as shown at 31 thereby providing a vertically extending plate or flange which, if desired, may be made slightly more rigid by welding to the lower flange 29 and the upper flange 17 at 33 and 34 respectively. Preferably, in order to prevent said end flange 31 from engaging directly against the top of the axle, and to insure its abutting against the side of the bracket or bolt head 12, I prefer to punch out the middle of the flange so as to provide a circular flange or rim 35 around the aperture in said flange 31, which receives the securing bolt 36.

The said securing bolt 36 is formed with an ordinary squarehead 37 which engages the inner surface of the vertical flange 31, the shank of the bolt passing through the transverse aperture, through the bracket 12, which transverse aperture in the ordinary Ford car receives the end of the standard radius rod. It will be observed that when the nut 38 is screwed home, the outer edge of the circular flange 35 is forced tightly in engagement with the side of the bolt head 12, and by reason of the fact that the bottom of the axle 10 is positively positioned by means of the shank 13 and the lug 30, the axle is automatically and positively forced into its correct, inclined position as indicated in Fig. 1 of the drawings.

Owing to the fact that the cross-section of the truss 16 is such as to positively and effectually resist all ordinary and extraordinary bending stresses, there is no possible chance for the axle 10 to be forced from its correct inclined position either temporarily or permanently. The result is that a Ford car equipped with a set of my improved radius trusses will initially and thereafter maintain the axle in correct position. It will also be observed that no fitting, adjustment or special mechanical work is required since the parts are so made that the installment of the device in place of the ordinary Ford radius rod accomplishes the result aimed at without such special attention. This is, of course, due to the fact that relative positions of the lug 30 and the flange 35 are determined in advance and maintained in such relation by the rigid connecting web 21 and flange 31. In this connection it may be well to point out the distinction between my device and such a device as is described in the U. S. patent to Knudsen, No. 1,221,190, issued April 3rd, 1917.

Although I have described the parts of the device in considerable detail, it will, of course, be understood that such details are merely illustrative of a preferred application of my invention, the scope of which should be determined by reference to the appended claims.

I claim:

1. In a device of the class described, the combination of a frame, a front axle, a universal joint on said frame in rear of the axle, a bolt extending through said axle from top to bottom, a head on said bolt provided with a transverse aperture, a radius rod of suitable cross-section, to resist bending strains efficiently, and extending from the universal joint to the axle, and having a lower lug extending below the axle, fitting and receiving the shank of said bolt, an upper abutment on said rod, the upper part of said axle being provided with an opposing abutment, and a tie member extending through said aperture for holding said abutments in engagement, said lug and abutment on said rod being rigidly connected together adjacent the front end of said rod.

2. In a device of the class described, the combination of a frame, a front axle, a junction piece in rear of said axle, a universal joint pivotally connecting said junction piece to the frame, a bolt extending through said axle from top to bottom, a head on said bolt provided with a transverse aperture, a truss-like radius rod of suitable cross-section, to resist bending strain efficiently, and extending from the junction piece to the axle, and having a lower lug extending below the axle, fitting and receiving the shank of said bolt, a perforated flange on said rod engaging said head, and a bolt extending through said flange and said aperture for holding said flange and said head in engagement, said lug and flange being rigidly connected together adjacent the front end of said rod.

3. In a device of the class described, the combination of a frame, a front axle, a junction piece in rear of said axle, a universal joint pivotally connecting said junction piece to the frame, a bolt extending through said axle from top to bottom, a head on said bolt provided with a transverse aperture, a flanged sheet metal radius rod of suitable cross-section, to resist bending strain efficiently, and extending from the junction piece to the axle, and having a flange extension constituting a lower lug extending below the axle, fitting and receiving the shank of said bolt, a perforated flange on said rod engaging said head, and a bolt extending through said flange and said aperture for holding said flange and said head in engagement, said lug and flange being rigidly connected together by the web of the rod adjacent the front end of said rod.

Chicago, Illinois, January 7, 1919.

WALTER G. HOY.